Patented May 16, 1944

2,349,090

UNITED STATES PATENT OFFICE 2,349,090

STABILIZED POLYDIAZO-PHTHALO-CYANINES

Norman Hulton Haddock, Blackley, Manchester, England, assignor to Imperial Chemical Industries Limited, a corporation of Great Britain No Drawing. Application May 19, 1942, Serial No. 443,668. In Great Britain May 25, 1939

5 Claims. (Cl. 260—141)

This invention deals with novel derivatives of phthalocyanine compounds, which may be designated generically as stabilized polydiazo-phthalocyanines.

It is an object of this invention to provide novel compounds of the phthalocyanine series, which may be useful in dyeing and printing textile fiber. Other and further important objects of this invention will appear as the description proceeds.

This application is a continuation-in-part of my copending applications Serial No. 335,871, filed May 17, 1940, and Serial No. 408,931, filed August 30, 1941. The former of these was issued April 21, 1942, as Patent No. 2,280,072.

In my parent applications I have described a novel method for producing metal-free and metallic tetra-amino-phthalocyanines. According to my said invention tetra-amino-phthalocyanines are prepared by reducing the corresponding tetra-nitro-phthalocyanines by the aid of special reducing agents such as sodium sulfide, sodium hydrogen sulfide, sodium disulfide, stannous chloride or sodium hydrosulfite.

As typical tetra-nitro-phthalocyanines which may be economically employed for this purpose, there were mentioned copper-tetra-(4)-nitro-phthalocyanine, copper-tetra-(3)-nitro-phthalocyanine, mixtures of these; other metallic tetra-nitro-phthalocyanines for instance those of cobalt, nickel, aluminum, lead or magnesium; and also metal-free tetranitro-phthalocyanine.

The tetra-amines thus obtained, in good yield, were described as generally green in color and insoluble in water. They are turned blue by the action of acids, for example hydrochloric acid, seemingly owing to salt formation. When subjected to the action of nitrous acid, they are readily diazotized, and in this form are useful as intermediates, namely diazo components, in the preparation of coloring matters.

In a similar manner, phthalocyanines having three or two diazonium groups may be prepared by starting with the corresponding trinitro and dinitro-phthalocyanines. These in turn may be prepared by synthesizing phthalocyanines from the preferred metal, say copper or cobalt, on the one hand and from a mixture of phthalonitrile and nitrophthalonitrile (in molal ratio 1:3 or 2:2, respectively) on the other hand. (See for instance my copending application, Serial No. 390,912.) Also, by starting with a tetra-nitro-phthalocyanine and reducing to a tetra-amino compound but using then a limited quantity of nitrous acid, phthalocyanine compounds containing less than four diazo groups per molecule may be produced.

My present invention is concerned primarily with the problem of stabilizing these polydiazo phthalocyanine compounds, whereby to obtain the same in solid state or equally stable form suitable for handling in commerce.

It is known that aryl diazonium compounds may be converted into various derivatives, of varying degrees of stability, which however may be divided generally into two classes:

I. Compounds which, in neutral or acid aqueous solution, show the reactions of the diazonium ion directly upon solution. This group comprises—

(a) Diazo compounds stabilized by double-salt formation with inorganic compounds such as polyvalent metal halides or fluoroboric acid;

(b) Diazo compounds stabilized by reaction with aryl sulfonic acids, such as naphthalene-1,5-disulfonic acid.

II. Compounds which are stable in neutral or alkaline solution, but do not give a diazonium cation in aqueous solution except upon acidification of the solution. This group comprises—

(c) The isodiazotates or "nitrosamines";

(d) Diazoamine- and diazoimino-compounds having water-solubilizing groups.

(e) Diazosulfonates of the formula

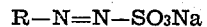

R—N=N—SO₃Na (K. H. Saunders, The Aromatic Diazo Compounds and Their Technical Applications, London, 1936, page 30.)

The members of group II if dissolved in water in the absence of acid dissociate into alkali-metal cations, and anions which contain the aryl-diazo radical. Treatment with acid however, converts them in situ into a diazonium salt of the acid selected, which ionizes then into a diazonium cation and the anion of the selected acid.

The compounds of group I are sometimes referred to as "active" stabilized diazo-compounds, while those of group II are called "passive." (Saunders, ibid.)

The present invention is based on the discovery that phthalocyanines having from 1 to 4 amino groups in their arylene nuclei, and obtainable by reduction of the corresponding nitro-phthalocyanines, can be diazotized by treatment, in usual fashion, with agents forming nitrous acid, and that these diazonium compounds may be converted into derivatives of either of the above two types I and II.

This result was by no means readily foreseeable, inasmuch as we have found that the so-called amino-phthalocyanines prepared from amino-phthalic acid derivatives (for example by heating amino-phthalimide with urea and cuprous chloride), do not diazotize, and therefore cannot form the various stable polydiazonium compounds of this invention.

The diazotized amino-phthalocyanines have valuable affinity for cellulosic fiber. Their conversion derivatives of this invention are stable in solid form, and possess various degrees of stability when in solution. This invention, therefore, opens the field to a new series of phthalocyanine compounds which may be used in the arts of dyeing and printing cellulosic fiber.

For the sake of simplifying the discussion, the tetradiazo compounds will be treated hereinafter as typical of the entire group, but it should be understood that my invention is not limited, and may be applied to any compound of the phthalocyanine series having from 1 to 4 diazo groups per molecule.

According to my invention, the tetradiazo compounds of the phthalocyanine series obtained above may be precipitated in a form suitable for technical handling, that is in solid state, by adding to the solutions thereof zinc chloride, cadmium chloride or other salt suitable for the production of double salts of aryl diazonium compounds, for instance cobalt chloride, ferric chloride, mercuric chloride, fluoroboric acid, etc. Alternatively, they may be treated with naphthalene sulfonic acid or other aryl sulphonic acids which will give salts of the tetradiazo compounds sparingly enough soluble in water to be precipitated, e. g. naphthalene-1,5-disulfonic acid, naphthalene-trisulfonic acid, benzene-sulfonic acid, phenol-2,4-disulfonic acid, 4-sulfophthalic acid, and the alkali-metal salts of these acids.

Again, the tetradiazonium derivatives may be isolated in solid state by converting them into the corresponding alkali-metal-isodiazotates. The latter I have found can be made by the usual methods employed in converting aromatic diazonium salts into the corresponding isodiazotates. For example, the potassium tetra-(4)-iso-diazotate of copper phthalocyanine is prepared by adding a solution of the tetradiazonium chloride to an excess of aqueous potassium hydroxide at $-10°$ C. and then adding the mixture to a large volume of concentrated aqueous potassium hydroxide at not less than about $120°$ C.

A fourth method is to convert the tetradiazo compound into a tetra-diazoimino compound by treatment with a primary or secondary amine capable of forming diazoimino compounds with diazotized amines in general and possessing water-solubilizing groups (e. g. sulfo and carboxy groups), as typified by methyl-taurine, N-methyl-glycine and N-methyl-anthranilic acid.

Finally, the tetradiazo compound may be treated with sodium sulfite to convert it into a tetra-diazo sulfonate.

I have found that the above stable derivatives of tetradiazo-phthalocyanines, whether of the double-salt type or of any of the other types, possess valuable properties, and may be used as intermediates for the production of phthalocyanine azo dyestuffs either in substance or on the fiber.

Thus, the derivatives of the "active" type may be applied to cellulosic fiber from aqueous bath and then developed on the fiber with various azoic coupling components, producing violet to green and grey shades of good fastness properties, including outstanding fastness to washing. (See copending application of Blackshaw and Haddock, Serial No. 355,692, filed September 6, 1940, or the corresponding British Patent No. 535,935.) Among the azoic coupling components suitable for this purpose may be mentioned phenol, $\beta$-naphthol, 2-hydroxy-3-naphthoic anilide, bis-acetoacet-o-tolidide, 1-phenyl-3-methyl-5-pyrazolone, resorcinol, $\alpha$-naphthol, 2:3 - hydroxy - naphthoic - o - toluidide, 2:3-hydroxynaphthoic-p-anisidide and the p-chloranilide of 2-hydroxycarbazole-3-carboxylic acid. Or the diazonium salts may be coupled to said azoic coupling components in a reaction vessel, producing the corresponding pigments in substance.

Again, they may be used for developing azo colors on the fiber by dyeing or printing them onto cellulosic fiber which has been first padded, in usual fashion, with "ice-color" coupling components, such as $\beta$-naphthol or the arylides of 2,3-hydroxy-naphthoic acid. It will be noted incidentally that this mode of utility is inherent also in the freshly-prepared poly-diazonium compounds of the phthalocyanine series, that is, before conversion into the stabilized forms hereinabove discussed.

In the case of the diazonium derivatives of the passive type variations in application procedure well-known in the art are employed. For example cotton cloth impregnated with an ice-color coupling component may be printed with a paste containing an isodiazotate or diazoamino compound of tetra-amino-copper-phthalocyanine. The coupling on the fiber is then effected by steaming in the presence of acid vapors, e. g. acetic or formic acid. Alternatively the coupling component may be incorporated into the printing paste. If a solution of the azotized amino-phthalocyanine is desired, a sample of the isodiazotate, for example, may be stirred in cold concentrated hydrochloric acid to produce it. The diazosulfonates and diazoamino compounds, however, are not readily converted to solutions of the free diazo compounds.

Alternatively, the stable phthalocyanine-diazonium compounds of this invention may be applied to the fiber from aqueous bath, and then treated on the fiber with reagents and under conditions adapted to decompose the diazonium groups liberating nitrogen, producing on the fiber insoluble phthalocyanine derivatives. (See the copending application of Blackshaw and Haddock above referred to.) Green to blue shades of excellent fastness properties may thus be obtained. The developing substances selected for this purpose may be organic or inorganic compounds, and the vast field of applicable agents may be illustrated by the following: water, ethyl alcohol, potassium iodide, potassium bromide, potassium ethyl xanthate, sodium ethyl xanthate, pyridine, sodium stannite, sodium sulphite, sodium oleyl sulphate, potassium ferrocyanide, ammonia, sodium sulphide, formic acid, sodium thiosulphate, benzoquinone, hydrazine sulphate, potassium cyanate, sodium formate, sodium hypophosphite, sodium thiocyanate, sodium cupracyanide and alkaline formaldehyde.

In the cases of the diazoaminos and diazosulfonates, due to their greater stability, the decomposition proceeds most rapidly and completely at higher temperatures, in the boiling point of the treating bath.

The dry, stabilized phthalocyanine diazonium compounds are green powders which are stable at ordinary temperature and can be stored for long periods out of contact with moisture. The double-salts, the diazoamino compounds, the diazosulfonates and the isodiazotates are readily soluble in water; the aromatic sulphonates are sparingly so. The solutions of the inorganic double salts and salts with aromatic sulfonic acids in water lose nitrogen rapidly on warming, with the formation of green precipitates.

The invention is illustrated but not limited by the following examples, in which the parts are by weight.

EXAMPLE 1.—*Zinc chloride double salt*

12.3 parts of finely divided copper-tetra-(4)-amino-phthalocyanine (prepared as in Example 4 of my parent application, Serial No. 335,871), in the form of an aqueous paste, are mixed with 120 parts of water and 6 parts of sodium nitrite. This mixture, cooled to 5° C., is then added to 90 parts of concentrated aqueous hydrochloric acid (sp. gr. 1.16) previously cooled to 0° C.

The clear dark green solution thus obtained, which presumably contains the tetradiazonium chloride of copper-tetra-(4)-amino-phthalocyanine, may be used directly in various dyeing operations. For instance, it may be neutralized with sodium acetate to Congo red, diluted with water to a concentration of about 0.15%, and employed, at a temperature of 0 to 5° C., to develop an azo dye upon fiber which has been padded with an ice-color coupling component such as beta-naphthol or the anilide of 2,3-hydroxy-naphthoic acid. For the purpose of the present invention, however, I prefer to treat this solution further to isolate a double-salt of the poly-diazonium compound, as follows:

To the clear dark green solution of the tetradiazo compound above obtained, a solution of 25 parts of zinc chloride in 50 parts of 0.5% aqueous hydrochloric acid is added. There is formed a dark green finely divided precipitate. This is filtered off, washed with acetone and dried. The product, a deep green powder, is a zinc chloride double salt. It is readily soluble in cold water to give a greenish blue solution.

Instead of 25 parts of zinc chloride in the above example, 35 parts of cadmium chloride may be used, resulting in the cadmium chloride double salt of the azotized phthalocyanine compound. If a solution containing 20 parts of fluoroboric acid (HBF4) is employed instead, a fluoro-boric-acid double salt is obtained.

In a similar manner, the zinc-chloride or other double salts, respectively, may be obtained from the various poly-diazonium compounds derived from cobalt- or nickel-tetra-(4)-amino-phthalocyanine; from copper-, cobalt-, or nickel-tetra-(3)-amino-phthalocyanine; from copper-, cobalt- or nickel tri-(3)- and tri-(4)-amino-phthalocyanine; and from the corresponding metal-free tetra- and tri-amino-phthalocyanines.

All these products are stable when dry, and may be incorporated into printing pastes to be used for printing cotton fabric which has been previously padded with an ice-color coupling component. Upon steaming under acid conditions, a water-insoluble azo dye is developed in the printed areas. If they are printed on unpadded cotton cloth and steamed under acid conditions, green prints are obtained which contain the products of decomposition of azotized aminophthalocyanines in the printed areas.

EXAMPLE 2.—*Stabilization with naphthalene-1,5-disulfonic acid*

30 parts of copper-tetra-(4)-amino-phthalocyanine (prepared as in Example 3 of my parent application, Serial No. 335,871), as a finely milled aqueous paste, are stirred with 20 parts of sodium nitrite and, in all, 500 parts of cold water. To this mixture (at below 10° C.) are quickly added, with stirring, 500 parts of 33% aqueous hydrochloric acid. After a few minutes stirring a clear deep green solution of the tetradiazo compound is obtained. The same result is obtained when the suspension of tetra-amino compound in aqueous sodium nitrite is added to the aqueous hydrochloric acid.

The above solution, which is now at a temperature of 5° C., is added to a solution of 160 parts of disodium naphthalene-1:5-disulphonate in 1200 parts of water, previously cooled to 0° C. The precipitated sulphonic acid salt is filtered off and washed with acetone and dried. The green product is sparingly soluble in water.

Similar results may be obtained by replacing the 160 parts of disodium-naphthalene-1,5-disulfonate, in the above example, by 190 parts of trisodium-naphthalene-trisulfonate, 185 parts of trisodium-4-sulfophthalic acid, or 90 parts of phenol-sulfonic acid. Instead of the sodium salts, the corresponding free acids may be employed.

Instead of copper-tetra-(4)-amino-phthalocyanine in the above example, any other of the metallic and metal-free tetra- and triamino phthalocyanine compounds mentioned in Example 1 may be employed.

The products of this type are less soluble and less stable in solution than the double salts obtained in Example 1. They may be used, however, in dyeing and printing according to the processes indicated in Example 1.

EXAMPLE 3.—*Potassium isodiazotate*

30 parts of finely-divided copper-tetra-(4)-amino-phthalocyanine (prepared as in Example 2 of my parent application, Serial No. 335,871), in the form of an aqueous paste, are mixed with 350 parts of water and 150 parts of concentrated aqueous hydrochloric acid (sp. gr. 1.16). To the mixture at 5° C. is added a solution of 15 parts of sodium nitrite in 50 parts of water. The temperature is maintained throughout at 5° C. or below. The dark green diazo solution is now added to a stirred mixture, at −10° C., of 1200 parts of potassium hydroxide and 800 parts of water. The green solution so obtained is added rapidly to a mixture of 1600 parts of potassium hydroxide and 400 parts of water previously heated to 120° C. The temperature is maintained at not less than 120° C. during the addition. The mixture is cooled to 100° C. and the tetra-isodiazotate, in suspension, is filtered off through asbestos paper. It is pressed under vacuum till dry. The product is a dark green powder soluble in cold water to give a bluish green solution.

Instead of potassium hydroxide, in the above example, equivalent quantities of sodium hydroxide may be employed. Instead of copper-tetra-(4)-amino-phthalocyanine as initial material, any other of the various tetra- and triamino-phthalocyanines mentioned in Example 1 may be substituted.

The products of this example may be applied most advantageously by printing on cotton cloth in the form of an alkaline, thickened printing paste. Said prints may be after-treated to decompose the isodiazotate by steaming under acid conditions (e. g. acetic, formic acid), or by boiling with aqueous solutions of the reagents indicated in copending application of Blackshaw and Haddock Serial No. 355,692 (later replaced by copending applications Ser. Nos. 444,106 and 444,107 of the same inventors), or with dilute aqueous acids or acid salts. The paste may be printed on cloth, which has been impregnated with an alkaline solution of an azoic coupling component, such as an arylide of beta-oxynaphthoic acid and dried. If this print is then steamed under acid conditions (e. g. acetic, formic acid), coupling on the fiber takes place.

Furthermore, printing pastes may be prepared, which contain alkali, the isodiazotate of one of the various amino-phthalocyanines above mentioned, an ice-color coupling component and a thickener. Such pastes, when printed on cloth and steamed under acid conditions, or when passed into an aqueous bath containing weak acids (e. g. acetic acid) or acid salts (e. g. sodium bichromate), form the dye on the fiber and yield green to brown prints.

Dyeings by one or the other of the methods disclosed in copending application of Blackshaw and Haddock Serial No. 355,692, may be made by treating these isodiazotates in the cold with aqueous acid (e. g. concentrated hydrochloric acid), which decomposes the isodiazotate and yields an aqueous solution of the normal diazonium compound.

EXAMPLE 4.—*Diazoimino compound*

30 parts of copper-tetra-(4)-amino-phthalocyanine are azotized as described in Example 3. This deep-green solution obtained is added slowly with stirring to a solution containing 17 parts of N-methyl-glycine and 650 parts of sodium carbonate in 9500 parts of water at 0–5° C. After stirring one hour, the product is isolated by salting with about 900 parts of sodium chloride, filtering and drying. The product is soluble in water and is very stable.

In lieu of the 17 parts of N-methyl-glycine in the above example, 28 parts of N-methyl-anthranilic acid or 27 parts of beta-(N-methyl-amino)-ethyl-sodium sulfonate may be used, with similar results.

Other amino compounds usable for the same purpose are pipecolinic acid, N-methyl glucamine, N-ethyl-5-sulfo-anthranilic acid.

In lieu of the phthalocyanine compound specified as initial material in the above example, 30 parts of copper-tetra-(3)-amino-phthalocyanine, 40 parts of copper-tri-(4)-amino-phthalocyanine, 30 parts of nickel-tetra-(4)-amino-phthalocyanine, or an equivalent proportion of any other of the metallic and metal-free phthalocyanines named under Example 1, may be employed.

The products may be applied to the fiber by converting an aqueous alkaline solution thereof to a printing paste with a suitable thickener (such as gum tragacanth or starch) and printing on cotton cloth or cloth impregnated with an alkaline solution of a substantive ice-color coupling component, followed by an acid steaming in the known manner, soaping and drying. Alternatively an ice-color coupling component may be incorporated in the alkaline printing paste; the paste is then printed on cotton cloth, steamed under acid conditions, soaped and dried.

EXAMPLE 5.—*Diazo-sulfonate*

30 parts of copper-tetra-(4)-amino-phthalocyanine are azotized as described in Example 3. The deep-green solution obtained is added slowly with stirring to a solution of 650 parts of sodium carbonate and 21.6 parts of sodium bisulfite in 9500 parts of water at 0–5° C. After stirring two hours, the diazo-sulfonate is isolated by adding about 900 parts of sodium chloride, filtering, and drying. The product is soluble in water and very stable.

In lieu of the tetramino phthalocyanine compound above specified, any other of the tetra- and triamino-phthalocyanines listed under Example 1 may be employed in equivalent proportion (based on the number of amino groups).

The products thus obtained are water-soluble and stable. They may be used for printing cotton fabric in the same manner as outlined under Example 4.

It will be clear that by this invention a new series of compounds are brought into existence which are characterized by the valuable shades and light-fastness of the phthalocyanine series of compounds; by their affinity for cotton fiber; and by their capacity to be applied thereto from aqueous solution or from a thickened aqueous printing paste.

As many apparently widely different embodiments of this invention may be made without departing from the spirit and scope thereof, it is to be understood that I do not limit myself to specific embodiments except as defined in the appended claims.

Subject matter disclosed above and not included in the scope of the subjoined claims is being claimed in the copending applications hereinabove referred to as well as in my copending application Serial No. 443,669 of even filing date herewith.

I claim:

1. A polydiazonium compound of the phthalocyanine series, stabilized in dry form by reaction with an inorganic compound selected from the group consisting of polyvalent-metal halides and fluoroboric acid, said polydiazonium compound being characterized by its solubility in water and its direct dissociation therein to liberate a phthalocyanine polydiazonium cation.

2. A tetradiazonium compound of the phthalocyanine series, stabilized in dry form by reaction with an inorganic compound selected from the group consisting of polyvalent-metal halides and fluoroboric acid, said tetradiazonium compound being characterized by its solubility in water and its direct dissociation therein to liberate a phthalocyanine diazonium cation.

3. A tetradiazonium derivative of the phthalocyanine series, stabilized in dry form by complex salt formation with a polyvalent metal halide.

4. The zinc chloride double salt of copper tetradiazo phthalocyanine.

5. The zinc chloride double salt of metal-free tetradiazo phthalocyanine.

NORMAN HULTON HADDOCK.